United States Patent [19]
Starkey

[11] Patent Number: 5,750,254
[45] Date of Patent: May 12, 1998

[54] TAPE WITH PLURAL ADHESIVE ZONES AND AN AUTOMOBILE PROTECTION ARRANGEMENT

[75] Inventor: John F. Starkey, Waterford, Wis.

[73] Assignee: RSW, Inc., Specialty Tapes Division, Racine, Wis.

[21] Appl. No.: 462,299

[22] Filed: Jun. 5, 1995

[51] Int. Cl.$^6$ ............................................. C09J 7/02
[52] U.S. Cl. ........................................ 428/343; 428/354
[58] Field of Search .................................. 428/343, 354

[56] References Cited

U.S. PATENT DOCUMENTS

| | | | |
|---|---|---|---|
| 4,201,799 | 5/1980 | Stephens | 428/142 |
| 4,839,206 | 6/1989 | Waldenberger | 428/354 |
| 4,844,973 | 7/1989 | Konishi | 428/354 |
| 4,942,071 | 7/1990 | Frye | 428/354 |
| 5,096,777 | 3/1992 | Schacht | 428/354 |
| 5,098,786 | 3/1992 | Hanke | 428/354 |
| 5,130,185 | 7/1992 | Ness | 428/354 |
| 5,206,070 | 4/1993 | Haibach et al. | |
| 5,211,784 | 5/1993 | Haibach et al. | |
| 5,342,665 | 8/1994 | Krawitz | 428/354 |
| 5,372,865 | 12/1994 | Arakawa | 428/354 |
| 5,462,782 | 10/1995 | Su | 428/354 |

*Primary Examiner*—Jenna Davis
*Attorney, Agent, or Firm*—Jansson, Shupe, Bridge & Munger, Ltd.

[57] ABSTRACT

A tape is disclosed including a flexible substrate having a first zone and a second zone, a first layer of adhesive disposed at the first zone and a second layer of adhesive disposed at the second zone. The tape can be permanently affixed to one surface and readily removable from another surface. An attachable protective sheet arrangement includes at least one piece the tape and a protective flexible sheet. The first zone is permanently affixed to the flexible sheet and the second zone is available for attachment to a surface.

12 Claims, 3 Drawing Sheets

TAPE WITH PLURAL ADHESIVE ZONES AND AN AUTOMOBILE PROTECTION ARRANGEMENT

FIELD OF THE INVENTION

This invention relates generally to adhesives and, more particularly, to tapes capable of being affixed to different surfaces.

BACKGROUND OF THE INVENTION

Applying or affixing an item or materials to a surface may be accomplished in a number of ways. Some involve the use of nails, staples, tacks etc. However, such arrangements are not suitable for use where damage or marring of the surface is not acceptable. Oftentimes adhesives or tapes containing such adhesives are used in such situations. Such adhesives or tapes are useful as they are easy to use and can be removed, often without permanent damage to the surface. However, such removal is sometimes difficult, requiring appropriate cleaners, solvents, manpower and time. In an effort to reduce these problems, removable adhesive tape is often used. Such tape is more easily removable, however problems are still encountered. Such removable adhesive tapes often still leave residue on the surface after removal requiring further cleaning and removal. Additionally, such removable adhesive tapes, because of their removable properties often do not sufficiently adhere to various surfaces and remain in place.

A further problem often encountered arises where it is desirable to affix two or more surfaces of different character adjacent one another. Each surface often has different characteristics such that one adhesive will adhere well to one surface but not well to another surface. Thus, one is forced to use two or more different tapes or utilize one tape with less than satisfactory results.

It is also often desirable to affix a sheet of one type of material to a surface and provide for removability of the sheet from the surface without leaving a residue or portion of the adhesive or tape on the surface. One such particular situation is in the protection of automobiles for storage and/or transport. When automobiles are transported, they are subject to damage from dust, rocks, environmental conditions etc., particularly the paint and finish of the automobile. In an effort to reduce the damage to automobiles during transport, it has become commonplace to "wrap" such automobiles in a protective covering or "cocoon." Such protective covering is then removed when the automobile reaches its destination. Common types of protective covering include foam-like coatings that adhere to the surface of the automobile and plastic wraps, such as shrink wrap-like materials, which are wrapped around the automobile.

Many problems and shortcomings are encountered with such coverings. These coverings are commonly disposed on the automobiles and often damage the finish, for example, due to abrasion. And that is not all. Many of these coverings leave residues on the automobile windows and body which must be washed off or buffed out. Further, these coverings typically do not withstand prolonged exposure to environmental conditions, such as ultra violet rays, heat, moisture, humidity, wind etc. They often degrade or detach from the automobiles during transport, thereby reducing their effectiveness. A new arrangement which addresses some of these disadvantages would be an important advance in the art.

OBJECTS OF THE INVENTION

It is an object of the invention to provide an arrangement which overcomes some of the problems and shortcomings of the prior art.

Another object of the invention is to provide a tape capable of adequately adhering to two or more adjacent surfaces of different types.

Still another object of the invention is to provide a tape capable of permanently adhering to one surface while remaining releasably adhered to another surface without deposit of a residue thereon.

Another object of the invention is to provide an arrangement for successfully protecting an automobile for transport.

An additional object of the invention is to provide an arrangement capable of protecting an automobile during transport which is readily removable without depositing a residue thereon requiring further cleaning of the automobile.

How these and other objects are accomplished will become more apparent from the following descriptions and from the drawings.

SUMMARY OF THE INVENTION

The invention involves a tape including a flexible substrate having a first zone and a second zone, a first layer of adhesive disposed at the first zone and a second layer of adhesive disposed at the second zone. Such a tape can be permanently affixed to one surface and readily removable from another surface. In one embodiment the substrate is elongated, and the first and second zones are elongated, extend along the length of the substrate, and are disposed parallel to each another. Additionally, an intermediate zone may be disposed between the first and second zones. Preferably this intermediate zone is devoid of adhesive. At least one protective release liner can be disposed adjacent at least one of the layers of adhesive.

The adhesives utilized with the present invention are preferably pressure sensitive adhesives. The first and second layers of adhesive can be the same or different adhesives. The first layer of adhesive is about 0.05–7 mils thick and the second layer of adhesive is also about 0.05–7 mils thick.

The invention also involves an automobile prepared for transportation. The automobile includes windows and a body with a finish thereon. A protective flexible sheet of material disposed over and adjacent to at least a portion of the body and windows is included. At least one piece of a tape having a flexible substrate with first and second zones is also included. A first layer of adhesive is disposed at the first zone and a second layer of adhesive is disposed at the second zone. The first zone is permanently affixed to the flexible sheet and the second zone is releasably attached to at least one of the windows. This allows for the automobile and its finish to be substantially protected from damage during transport in a manner facilitating easy unwrapping without leaving residual material.

The flexible protective sheet is selected from fabric material, plastic material, and blends thereof. In one embodiment, the substrate of the tape is elongated and the first and second zones are elongated, extend along the length of the substrate, and are disposed parallel to each another. Preferably, an intermediate zone is disposed between the first and second zones. This intermediate zone is preferably devoid of adhesive.

The first and second layers of adhesive of such an arrangement are preferably pressure sensitive adhesives, having a thickness of about 0.05–7 mils.

The invention further includes an attachable protective sheet arrangement. Such an arrangement includes a protective flexible sheet, at least one piece of a tape having a flexible substrate with first and second zones, a first layer of adhesive disposed at the first zone and a second layer of adhesive disposed at the second zone. The first zone is permanently affixed to the flexible sheet and the second zone is available for attachment to a surface. The protective flexible sheet is preferably selected from fabric material, plastic material, and blends thereof. In one embodiment the substrate is elongated and the first and second zones are elongated, extend along the length of the substrate, and are disposed parallel to each other. One embodiment includes an intermediate zone disposed between the first and second zones. In preferred embodiments this intermediate zone is devoid of adhesive. As in previous embodiments, the first and second layers of adhesive are preferably pressure sensitive adhesives. These first and second layers of adhesive can be the same or different adhesives and are about 0.05–7 mils thick.

Further details of the invention are set forth in the following detailed description and in the drawing.

DETAILED DESCRIPTION OF PREFERRED EMBODIMENTS

Figure 2:
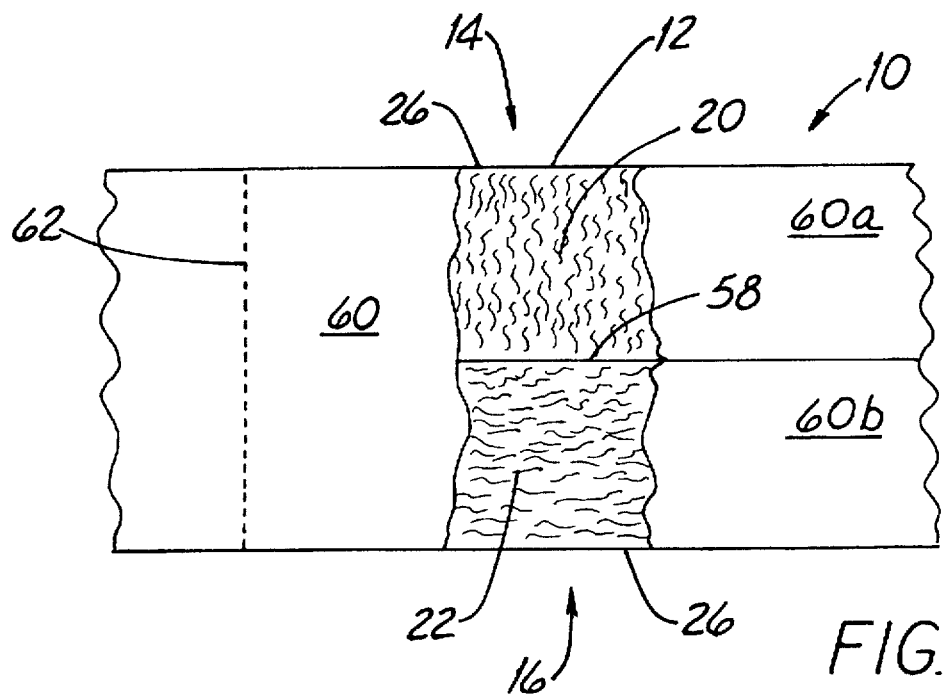
FIG. 2 is a plan view showing two embodiments of the invention.

As shown in FIG. 2, the tape 10 of the present invention includes a substrate or backing 12 having a first zone 14 and a second zone 16. A first layer of adhesive 20 is disposed at first zone 14 and a second layer of adhesive 22 is disposed at second zone 16.

Substrate 12 is preferably flexible and can be made from any number of materials such as plastic materials such as polyolefins, polyesters, etc., cellulosic material, such as paper, fabric etc., or any other suitable material. Substrate 12 can be reinforced with fiber, coated with strength promoting materials, laminations, etc. In preferred embodiments, substrate 12 is polyester.

Substrate or backing 12 can be of any color and can be opaque, transparent or translucent, depending on personal preference and desired use. It is believed that transparent or translucent substrate is preferable to aid in proper application.

The widths of the first and second zones 14 and 16 combined spans substantially the entire width of the substrate, leaving no more than a narrow width therebetween, e.g. less than 20%.

Figure 3:
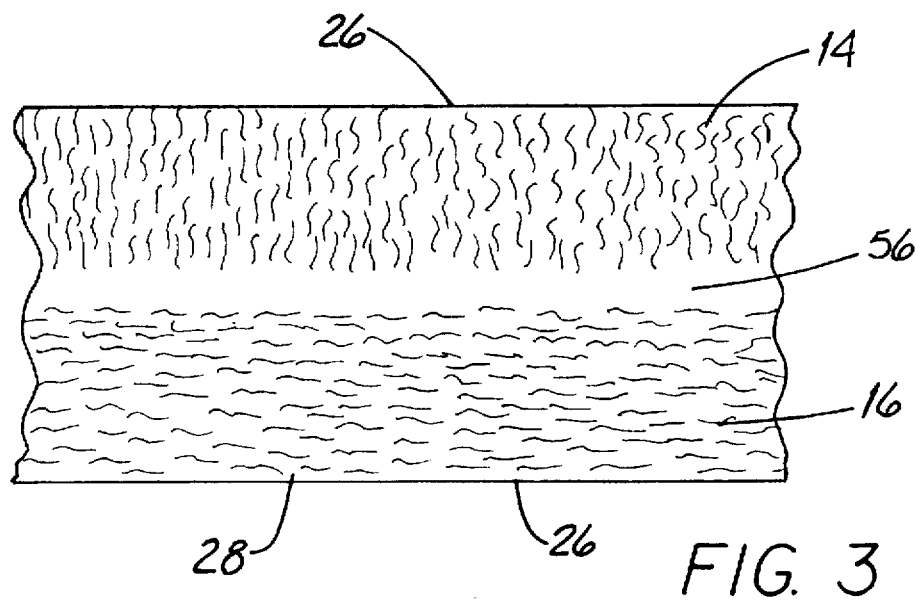
FIG. 3 is a plan view of another embodiment of the invention.

The adhesives of first and second layers 20, 22 respectively can be of any suitable adhesive. However, pressure sensitive adhesives are preferred. Such pressure sensitive adhesives are available in three basic types: acrylic adhesives, silicone adhesives and rubber-based adhesives. Adhesives of different types are selected based on the surface on which they are to be used and conditions to which they will be subject. Any number of adhesives can be employed depending on the use. One of ordinary skill in the art would be able to select suitable adhesives for a particular purpose. Adhesive layers 20 and 22 can extend to the edges 26 of substrate 12 or, as best seen in FIG. 3, the layers of adhesive can be disposed in zones 14 and 16 such that an area 28 along the edges 26 remains free of adhesive.

Tape 10 can be prepared using any number of methods. A single substrate 12 can be provided to which first and second layers of adhesive 20 and 22 are disposed by coating, lamination, extrusion etc. Alternatively, two separate substrates or backings 12, each with a zone having a layer of adhesive disposed thereon can be prepared and then laminated together in well known manner to provide tape 10 which includes first and second zones 14 and 16 respectively.

Figure 4:
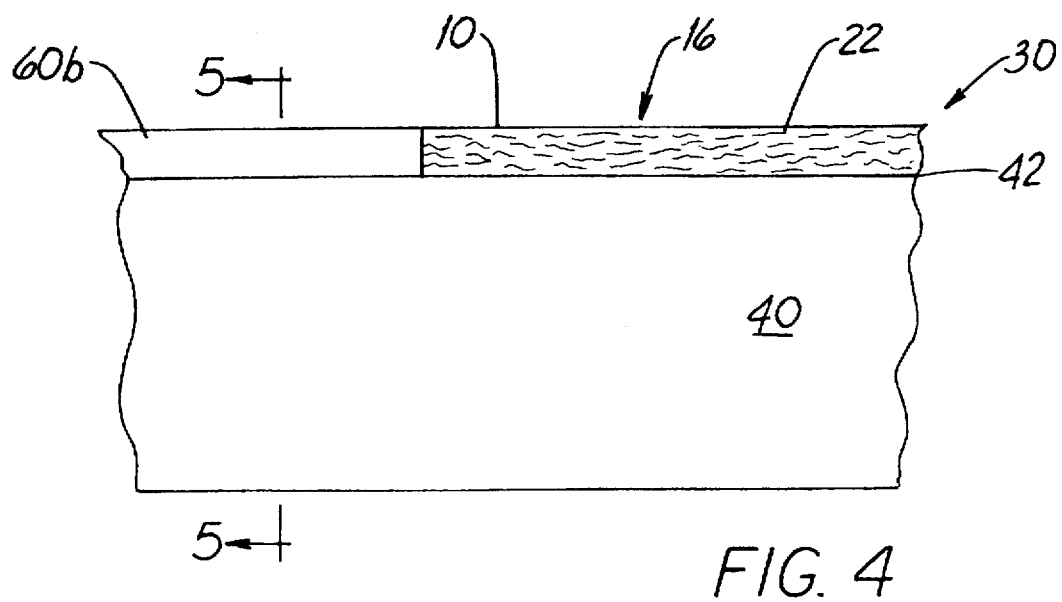
FIG. 4 is a prospective view, partially broken away, of the inventive arrangement.
Figure 5:
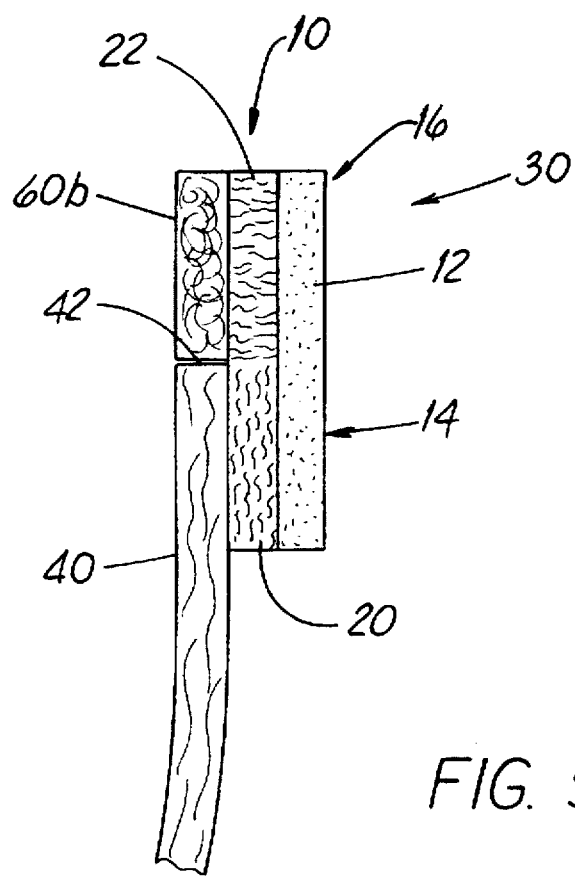
FIG. 5 is a cross-sectional view taken along line 5—5 of FIG. 4 depicting an embodiment of the inventive arrangement.

One possible use for the tape involves a protective arrangement 30 for the protection of automobiles during transport. As best seen in FIGS. 4 and 5, such an arrangement 30 includes tape 10 with a first layer of adhesive 20 capable of being permanently affixed to a flexible protective material 40, preferably in sheet-like form. The term "permanently affixed" as used herein with respect to a tape zone means such tape is unremovable, not easily removable, or at least less easily removable than a tape portion which is not "permanently affixed."

In protection of automobiles for transport, suitable adhesives for first layer 20 are high bond pressure sensitive adhesives. Such high bond pressure sensitive adhesives are commonly designated as "high tac" adhesives. These high bond adhesives adhere substantially permanently to a number of surfaces. Such high bond pressure sensitive adhesives exhibits a resistance to removal, oftentimes making separation impossible without creating distortion or delamination of the adhesive and damage to the material or surface to which they are adhered. First layer of adhesive 20 is about 0.05–7 mL thick. Preferably, first layer 20 of adhesive is about 1–5 mils thick. High bond pressure sensitive adhesives are available from a number of sources including Monsanto under the designation Adhesive 1151, H and N Chemical under the designation Adhesive 327 and Ashland Chemical under the tradename Aeroset® 1845.

Second layer of adhesive 22 is preferably a removable, non-residueing pressure sensitive adhesive. Such layer exhibits a bond strength that allows for ready removal. Removable pressure sensitive adhesives are commonly designated as "medium tac" adhesives. Such adhesives, while adhering to a surface, are readily removable by the application of manual force or the like. Such adhesive provides for limited or no residue deposit on a surface, to which that zone is affixed. Second layer 22 is about 0.05–7 mils thick. Preferably, second layer 22 is about 1–5 mils thick. Suitable removable pressure sensitive adhesives are available from a number of sources including Morton Chemical under the tradename Morstik® 240 and Morstik® 243, H and N Chemical under the tradename Polytac® 4292 and Polytac® 41-93G, Ashland Chemical under the tradenames Aeroset® 1450 and Aeroset® 1452, and Basic Adhesives under the designations Adhesive R102-14-1, Adhesive R102-14-2, and Adhesive 4347. Additionally, many high bond pressure sensitive adhesives can be modified by the addition of cross-linking agents resulting in removable pressure sensitive adhesives. Thermosetting adhesives may be utilized to produce removable characteristics.

It is noteworthy to mention that first and second layers 20 and 22 can be the same adhesive in different thickness or density, or different adhesives. Such is dependent on the material or surface to which the adhesive is bound and the conditions to which such tape with the adhesive will be subject. One of ordinary skill in the art will known the appropriate adhesives for the desired conditions, use and results.

To protect an automobile 50 during transport, a protective material or sheet 40 is utilized. Protective sheet 40 can be any number of materials including plastics, textiles, including fabrics, papers, polyesters, etc. and blends, laminations, composites etc. thereof. Polyolefins are particularly suitable for use as the protective sheet because of they do not mar the finish of an automobile and are durable. One material particularly suitable for such protective material is bonded polypropylene, available from DuPont under the trademark Tyvek®.

Figure 1:
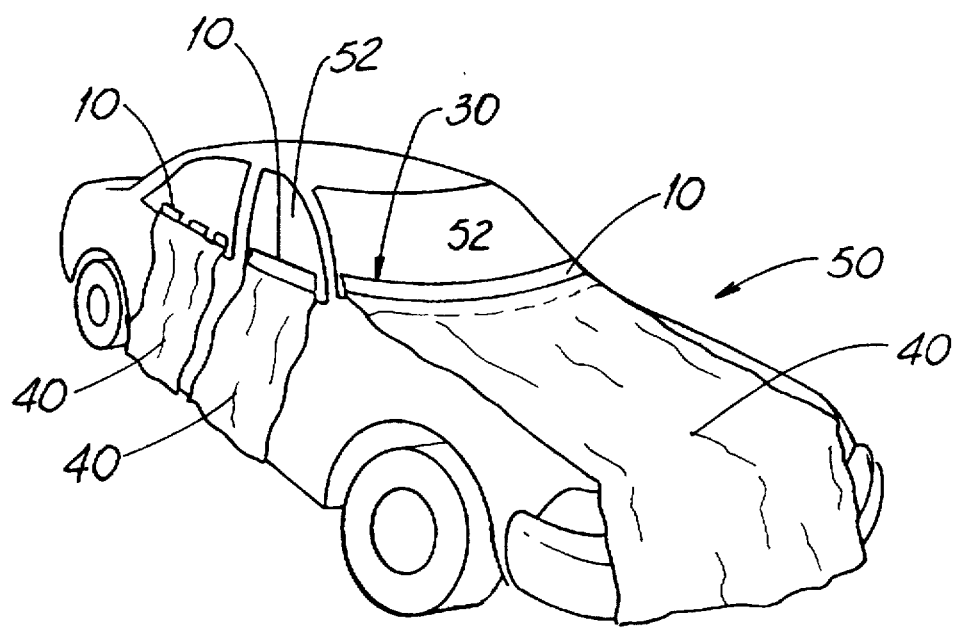
FIG. 1 is an isometric view of an automobile prepared for transport with the inventive tape and arrangement.

In use, as best seen in FIG. 1. zone 14 with its first layer of adhesive 20 is permanently affixed to an edge 42 of protective sheet 40. Second zone 16 with second layer of adhesive 22 is affixed to the windows 52 of the automobile. Tape 10 can be used in long strips or short segments as shown. The entire automobile 50 is wrapped in the protective material 40. Care should be taken to affix the entire first zone 14 to protective sheet 40 to avoid contact of the windows 52 or finish of the automobile by the first layer of adhesive 20. After transport, second zone 16 of tape 10 is pulled by manual pressure or the like to remove from the windows 52. Because second zone 16 includes a layer 22 of removable, non-residueing pressure sensitive adhesive, windows 52 are left substantially residue free. Thus, once automobile 50 is unwrapped, no further cleaning or buffing of the exterior is required.

As best seen in FIG. 3 to assist in avoiding contact of windows or finish of the automobile by the layer of adhesive 20 at the first zone 14, an intermediate zone 56 can be included disposed between the first and second zones 14 and 16. This intermediate zone 56 is preferably devoid of adhesive and provides a buffer zone of sorts to avoid undesirable contact of the automobile surfaces by the high bond pressure sensitive adhesive of layer 20 which could cause damage to the finish of the automobile or at least require efforts, often substantial, to remove the adhesive from the finish and windows of an automobile.

Additionally, first and second zones 14 and 16 may be manufactured as different colors to assist in appropriate application to protective sheet 40 and another surface. Pigment can be incorporated by any number of ways or known methods. The various zones of the substrate can include different pigment, the adhesive layers can include different pigment etc. Pigment can be included at one zone and not at the other. Alternatively, reference lines 58 can be included along the length of the tape to distinguish the boundary between one zone and another.

Tape 10 can be sold in roll or strip form. The strips can range in length from a few inches to feet. To assist in easy application a protective liner 60 can be included over the layers of adhesive 20 and 22. As shown in FIG. 2. protective liner 60 can be a single liner covering all zones, or separate liners 60a and 60b covering each zone. Additionally, liner 60 can include perforations or cuts 62 at various intervals to allow for removal of the liner and exposure of a manageable length of the corresponding protected zone. Likewise, tape 10 can include perforations or cuts through substrate 12 at various intervals to allow for tearing of the tape into manageable lengths.

Although tape including only two and three zones is discussed, it is within the scope of the invention to provide a tape with multiple zones, depending on the desired use.

While the principles of the invention have been described in connection with specific embodiments, it is to be understood clearly that such embodiments are by way of example and are not limiting.

What is claimed:

1. In combination, a flexible sheet, a motor vehicle having a finish protected by the sheet, and an elongate strip of tape securing the sheet with respect to the motor vehicle and wherein the tape includes:

first and second opposed surfaces;

a first zone and a second zone disposed on the first surface substantially parallel to each other, the first and second zones being elongated and extending along the tape;

an intermediate zone disposed between the first and second zones;

a first layer of adhesive disposed at the first zone and adhering only to the sheet;

a second layer of adhesive disposed at the second zone and removably adhering to the finish;

the second surface is substantially free of adhesive; and the finish, the sheet, the tape and its layers are substantially coplanar, whereby the first surface is substantially coated with adhesive, and the tape is substantially permanently affixed to the sheet and is readily removable from the vehicle, thereby temporarily protecting the vehicle finish.

2. The combination of claim 1 wherein the intermediate zone of the tape is free of adhesive.

3. An attachable protective sheet arrangement for protecting the finish of a motor vehicle including:

a protective flexible sheet;

at least one piece of flexible tape attached to the sheet and having a first surface and second surface, with the first surface having first and second zones separated by an intermediate zone, a first layer of adhesive disposed at the first zone and a second layer of adhesive disposed at the second zone, the first zone being permanently affixed to the flexible sheet and the intermediate zone being substantially free of adhesive and substantially coplanar with the first zone.

4. The arrangement of claim 3 wherein the protective flexible sheet is selected from fabric material, plastic material, and blends thereof.

5. The arrangement of claim 3 wherein the tape is elongated and the first and second zones extend along substantially the entire length of the tape and are disposed parallel to each other.

6. The arrangement of claim 3 further including a protective liner disposed on the second layer of adhesive.

7. The combination of claim 1 wherein the first and second layers have differing colors.

8. The combination of claim 3 wherein the first and second layers have differing colors.

9. In combination, a flexible sheet, a motor vehicle having a finish protected by the sheet, and a tape securing the sheet with respect to the motor vehicle and wherein the tape is an elongated strip that includes:

first and second surfaces;

elongated first and second zones on the first surface, such zones being substantially parallel to each other and extending along the length of the tape;

a first layer of adhesive disposed at the first zone and adhering only to the sheet;

a second layer of adhesive disposed at the second zone and removably adhering to the finish;

an intermediate zone disposed between the first and second zones;

the second surface is substantially free of adhesive; and the finish, the sheet, the tape and its layers are substantially coplanar, whereby the tape is substantially permanently affixed to the sheet and is readily removable from the vehicle, thereby temporarily protecting the vehicle finish.

10. The combination of claim 9 wherein the intermediate zone of the tape is free of adhesive.

11. In combination, a flexible sheet, a motor vehicle having a finish protected by the sheet, and a tape securing the sheet with respect to the motor vehicle and wherein the tape includes:

first and second surfaces;

a first zone and a second zone on the first surface;

a first layer of adhesive disposed at the first zone and adhering only to the sheet;

a second layer of adhesive disposed at the second zone and removably adhering to the finish having a lower bond of adhesive than the first layer;

the second surface is substantially free of adhesive; and the finish, the sheet, the tape and its layers are substantially coplanar;

and wherein:

the first and second layers of adhesive are different adhesive substances; and the first layer is a high-bond adhesive, whereby the tape is substantially permanently affixed to the sheet and is readily removable from the vehicle, thereby temporarily protecting the vehicle finish.

12. In combination, a flexible sheet, a motor vehicle having a finish protected by the sheet, and a tape securing the sheet with respect to the motor vehicle and wherein the tape includes:

first and second surfaces;

a first zone and a second zone on the first surface;

a first layer of high-bond adhesive disposed at the first zone and adhering only to the sheet;

a second layer of adhesive disposed at the second zone and removably adhering to the finish, said second layer of adhesive being of an adhesive substance different from the first layer of adhesive;

the second surface is substantially free of adhesive; and the finish, the sheet, the tape and its layers are substantially coplanar, whereby the first surface is substantially coated with adhesive, and the tape is substantially permanently affixed to the sheet and is readily removable from the vehicle, thereby temporarily protecting the vehicle finish.

* * * * *

UNITED STATES PATENT AND TRADEMARK OFFICE
CERTIFICATE OF CORRECTION

PATENT NO. : 5,750,254
DATED     : May 12, 1998
INVENTOR(S) : John F. Starkey

It is certified that error appears in the above-identified patent and that said Letters Patent is hereby corrected as shown below:

Column 4, lines 35-36
  delete the sentence "First layer of adhesive 20 is about 0.05-7 mL thick.."

Signed and Sealed this

Fifteenth Day of September, 1998

Attest:

BRUCE LEHMAN

Attesting Officer

Commissioner of Patents and Trademarks